F. STAUD Y XIMENEZ, DEC'D.
F. J. SALAS, ADMINISTRATOR; A. BEREA, ADMINISTRATOR DE BONIS NON, VICE F. J. SALAS, RESIGNED.
APPARATUS FOR RAISING SUNKEN VESSELS.
APPLICATION FILED JUNE 28, 1919.
1,348,595.
Patented Aug. 3, 1920.
5 SHEETS—SHEET 1.
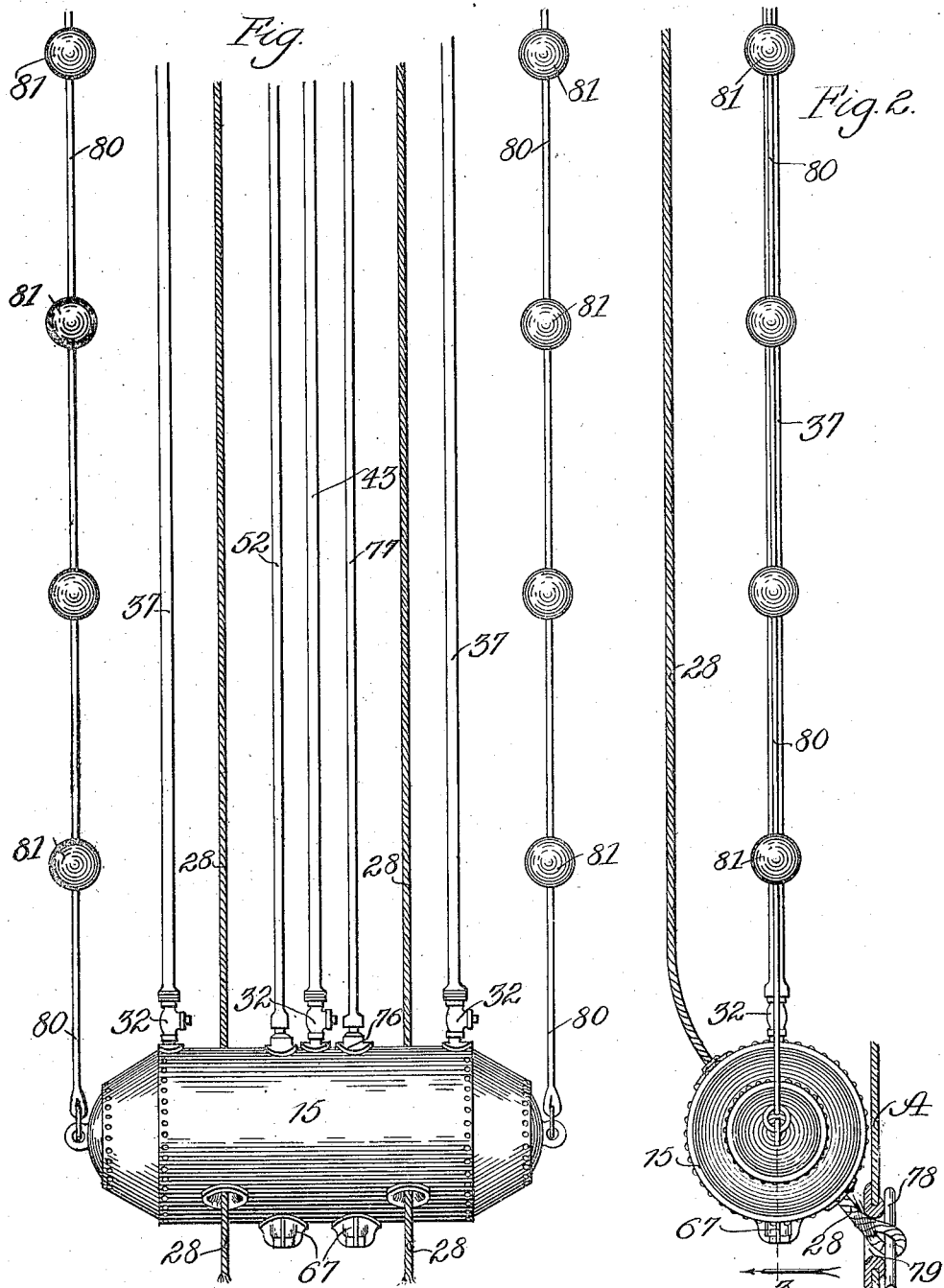

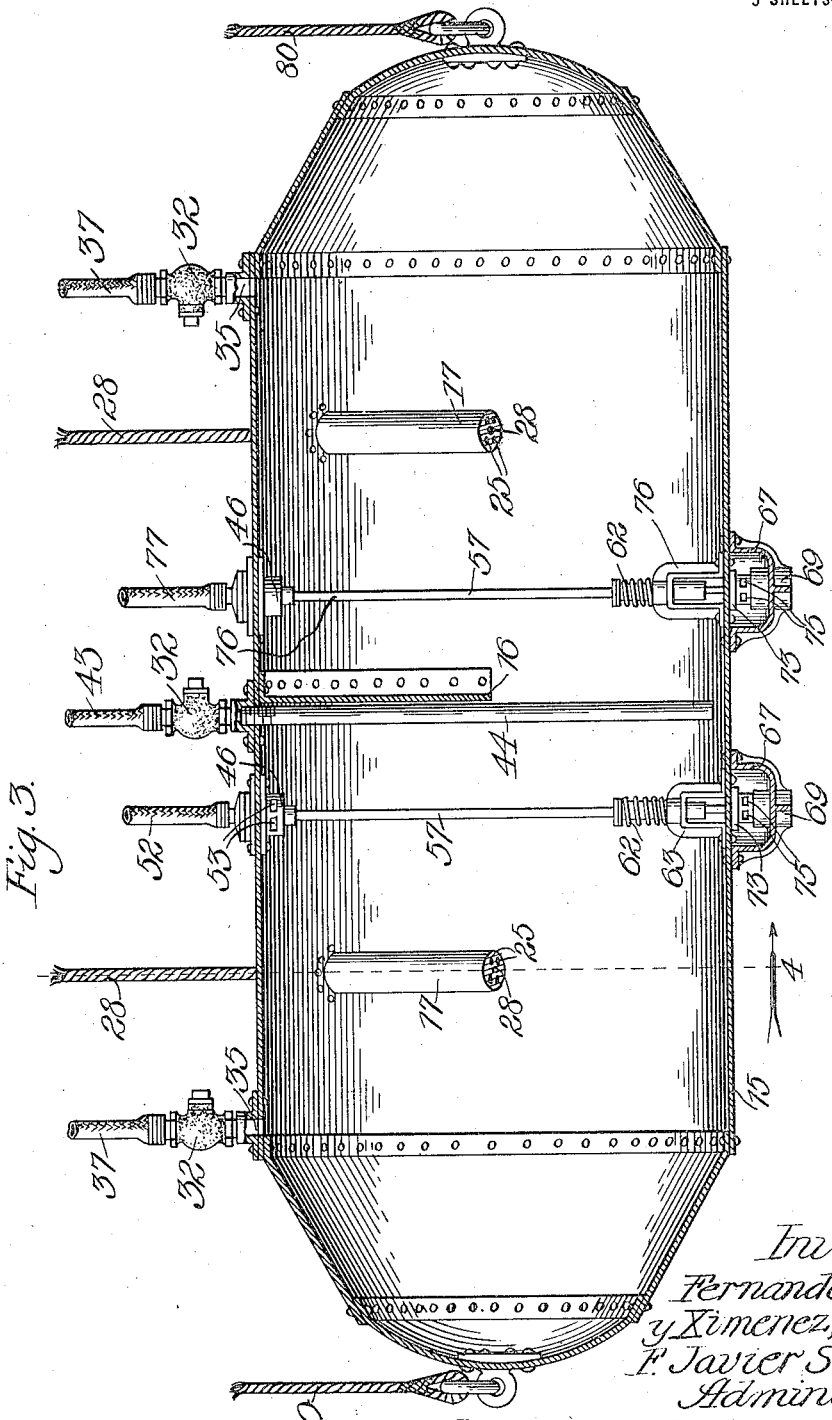

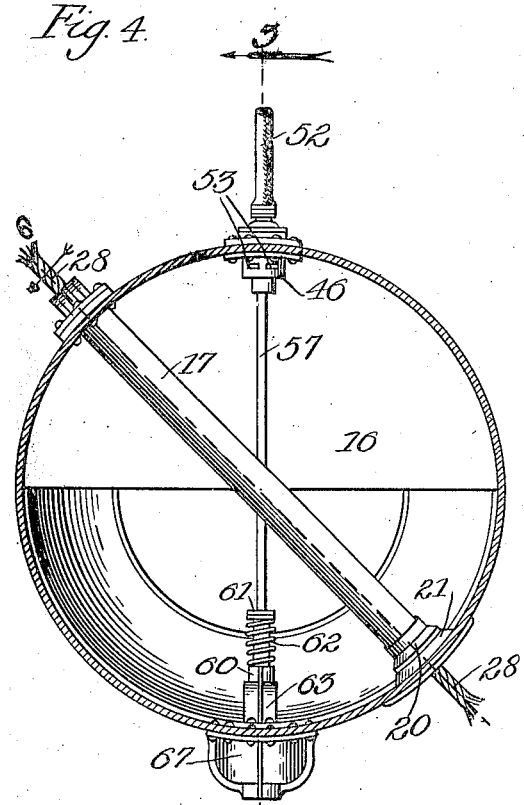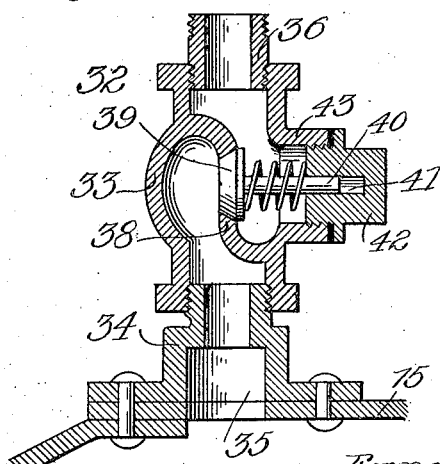

F. STAUD Y XIMENEZ, DEC'D.
F. J. SALAS, ADMINISTRATOR; A. BEREA, ADMINISTRATOR DE BONIS NON, VICE F. J. SALAS, RESIGNED.
APPARATUS FOR RAISING SUNKEN VESSELS.
APPLICATION FILED JUNE 28, 1919.

1,348,595.

Patented Aug. 3, 1920.
5 SHEETS—SHEET 4.

Inventor:
Fernando Staud y Ximenez, deceased,
F. Javier Salas, Administrator,
By Dyrenforth Lee Chritton and Wiles,
Attys.

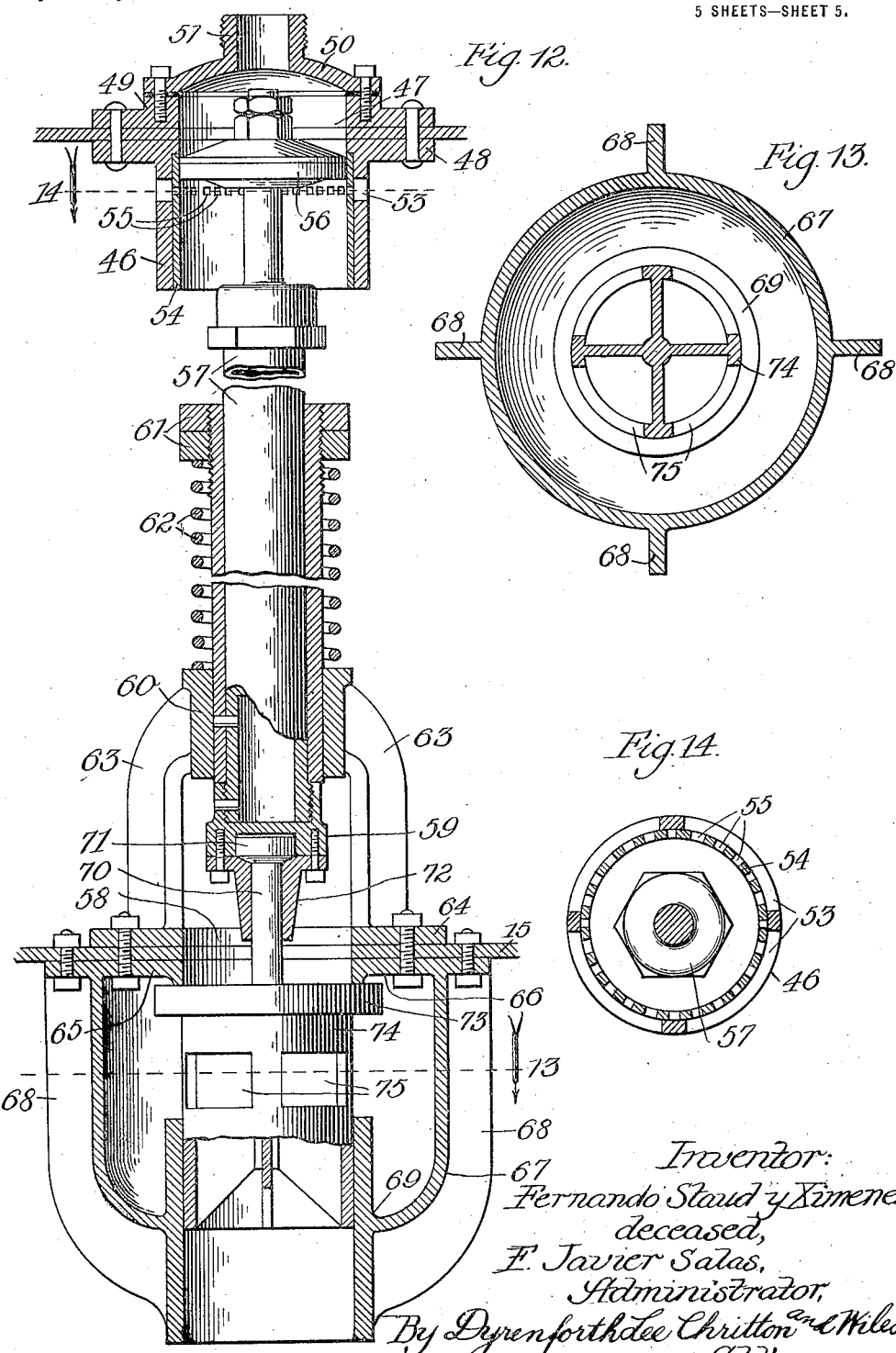

UNITED STATES PATENT OFFICE.

FERNANDO STAUD Y XIMENEZ, DECEASED, LATE OF NEW YORK, N. Y., BY FRANCISCO JAVIER SALAS, OF NEW YORK, N. Y., ADMINISTRATOR OF SAID FERNANDO STAUD Y XIMENEZ, DECEASED; ALEJANDRO BEREA ADMINISTRATOR DE BONIS NON, VICE FRANCISCO JAVIER SALAS, RESIGNED.

APPARATUS FOR RAISING SUNKEN VESSELS.

1,348,595.    Specification of Letters Patent.    Patented Aug. 3, 1920.

Application filed June 28, 1919. Serial No. 307,409.

*To all whom it may concern:*

Be it known that FERNANDO STAUD Y XIMENEZ, formerly a subject of the King of Spain, lately residing at New York city, New York, deceased, (FRANCISCO JAVIER SALAS, administrator, ALEJANDRO BEREA, present administrator, succeeding the prior administrator,) has invented a new and useful Improvement in Apparatus for Raising Sunken Ships, of which the following is a specification.

This invention relates to improvements in the construction of a pontoon and its equipment for rendering it submergible by filling with water to sink it to the point for attachment to a sunken ship to be raised, and buoyant, in its submerged position by displacing its contained water with air, to adapt it to rise under the force of the pressure of the body of water about it for raising the sunken ship.

The more important objects of this invention are to provide for sinking the pontoon with an even keel throughout its descent in the water, meaning without endwise tipping, which would tend to bind it against the guiding-cables and obstruct its progress to the point of attachment to a sunken ship, and to automatically vary the air-pressure within the pontoon in its rise as the external pressure against it of the surrounding body of water varies, to thus equalize these pressures and avoid tendency of the internal air-pressure to burst the pontoon; and other objects are accomplished by the present improved construction hereinafter described.

Figure 7:
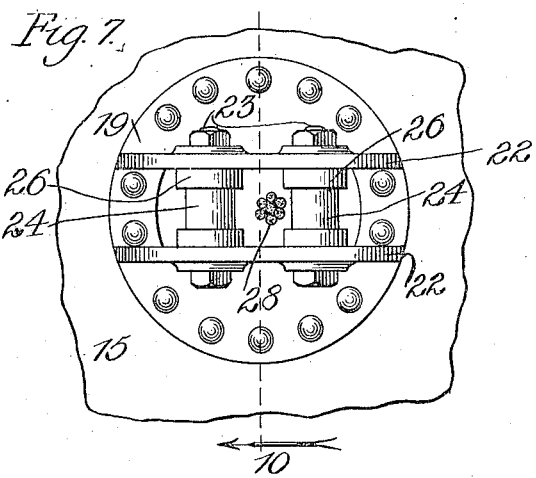
Figure 10:
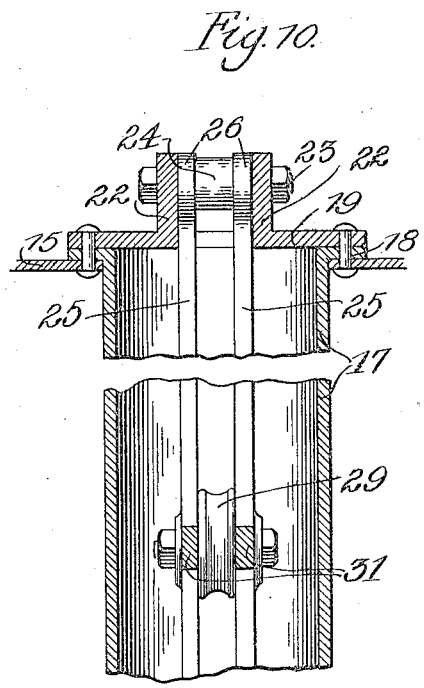
Figure 8:
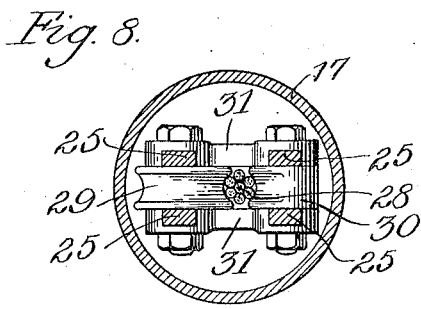
Figure 11:
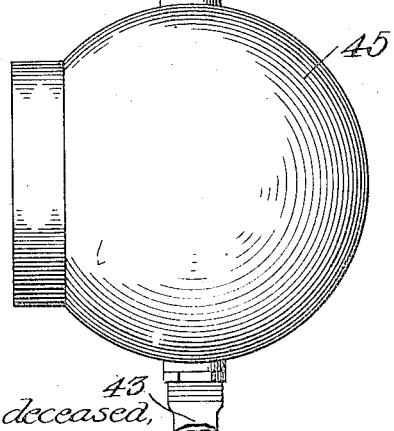
Figure 9:
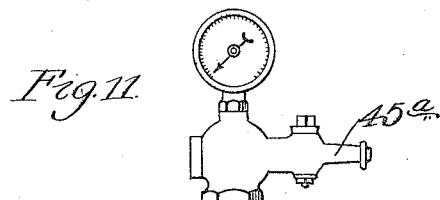

In the accompanying drawings, Figure 1 is a view in the nature of a diagram, showing the pontoon in side elevation with its equipment of valve-devices for controlling the inlet and outlet of water and air and the pipes and cables connected with it; Fig. 2 is an end view of the same showing, in section, one means suitable for attaching a guide-cable to a sunken ship; Fig. 3 shows the pontoon on a larger scale by a section on line 3, Fig. 4; Fig. 4 is a section on line 4, Fig. 3; Fig. 5 is a sectional view of a desirable construction of check-valve for the air-outlets on the pontoon; Fig. 6 is an enlarged broken section on line 6, Fig. 4, showing a guide-cable and one form of its gripping means; Fig. 7 is a top plan view of the showing in Fig. 6; Figs. 8 and 9 are sections on lines 8 and 9, respectively, Fig. 6; Fig. 10 is a broken section on line 10, Fig. 7; Fig. 11 is a view in elevation of a suitable hydrometer and gage device for indicating the water-evacuation of and pressure within the pontoon; Fig. 12 is a view in broken sectional elevation of the valve-device for controlling the inlet of air at one end into the pontoon and at its opposite end the outlet of water therefrom; and Figs. 13 and 14 are sections on lines 13 and 14, respectively, Fig. 12.

The shell 15 is constructed of boiler-metal or other suitable material in cylindrical form, with tapering ends to adapt it to resist the pressures to which it is subjected in use, without cumbersome bracing. The preferred more usual dimensions of the shell are about 40 ft. in length by 15 ft. in diameter, to attain great power with ease of handling. Between the ends, and preferably midway thereof, extends downwardly to or about to the longitudinal center of the shell, a rigid transverse partition or partial bulkhead 16, dividing the upper part of the shell into two compartments in each of which extends diagonally, at an angle of about 45 degrees, a tube 17, these tubes being about midway between the partition and the ends of the shell and being provided for the cables used for guiding the pontoon in placing it, as hereinafter described. Each tube is preferably like that best shown in Fig. 6 and open-ended, with a flange 18 about its upper end and a ring 19 thereon, through which and the flange the tube is riveted to the shell 15 about an opening therein for one end of the tube, the opposite end thereof being riveted to one section of an angular ring 20 surrounding it, and having its other section riveted to a downwardly-flaring cable-guiding throat 21 spreading through a lower opening in the shell to extend about and overlap the edge of the opening to which it is riveted. Heads 22 are shown fastened to the ring 19 to extend in parallel, spaced relation across the upper end of the tube at opposite sides of its longitudinal center, and a pair of hanger-bolts 23 extend through them at opposite sides of their transverse centers and carry spacing-thimbles 24. A pair of bars 25 are suspended, at eyes 26 on their upper ends, upon each bolt 23, the members of each pair being spaced apart by a sleeve 24; and the bars are connected at their lower ends to a shelf 27 in the lower part of the tube 17, perforated for the free passage through it of a guide-cable 28 and to which the throat 21 about reaches at its inner end. At intervals between one pair of the bars 25 are eccentrically journaled peripherally-grooved clutch-pulleys 29 and coincident with each eccentric pulley is bolted, to extend between the opposite pair of these bars, a stationary abutment-shoe 30, shown of generally oval shape, with a groove in its face opposing the pulley coöperating with it. Five of these clutching pulleys and shoes are sufficient to be provided at intervals along the bars 25, and each clutch, formed by a pulley and the shoe coöperating therewith, is reinforced by braces 31 connecting the opposite ends of the pulley-journal with the ends of the shoe-fastening bolts. The clutch-mechanism illustrated and described may, however, be variously modified without departing from the present invention.

As will be seen, the shell 15 may freely descend along guide-cables 28 on which it is strung by their passing through the tubes 17 between the pulleys and shoes, since in the downward movement of the shell along the cables, when the latter are fastened at their opposite ends, as hereinafter described, the pulleys are turned outwardly against clutching or binding the cables between them and the shoes; whereas, movement of the pontoon-shell in the opposite, rising direction, turns the eccentric pulleys against the cables to bind the latter against the shoes and tightly hold the shell to the cables.

Near each end of the top of the cylindrical portion of the pontoon-shell is provided, for the escape of air therefrom, an outwardly-opening check-valve 32, a desirable construction of which is that shown in Fig. 5, involving a casing 33 screwed at its lower end upon a nipple 34 riveted about an opening 35 in the shell, with a threaded thimble 36 in its upper end adapted to have fastened to it one end of a flexible tube 37, the casing containing a partition 38 having a valve-seating opening through it for a horizontally-working spring-pressed valve-head 39, the stem 40 of which is reciprocatingly confined in the central bore 41 of a plug 42 screwed into a branch 43 projecting from a side of the casing.

Adjacent the partition 16 a pipe 44 depends through the top of the shell 15 and extends nearly to its bottom; and it carries on its outer end a check-valve 32, with which is connected one end of a flexible tube 43 having its opposite end connected with a combined hydrometer and pressure-gage device 45 (Fig. 11) of known construction, involving a valved water-discharge spout 45ª and serving the purpose hereinafter explained.

To one side of the pipe 44 the pontoon-shell is equipped with an upper air-admitting and lower water-discharging valve-device of the construction shown in Figs. 12 to 14, inclusive. This device comprises a short cylinder 46 extending inside the shell at an opening 47 therein, about which it is provided with a flange 48 riveted to the shell, the rivets also passing through the flange of a collar 49 to fasten it to the outer surface of the shell about the opening; and on this collar is seated and bolted a cap 50 provided with a central nipple 51 for attaching one end of a flexible tube 52. At suitable intervals about the cylinder, near its upper end, are formed relatively large air-ports 53; and within the cylinder is a bushing 54 containing, in the plane of the ports 53, a circumferential series of relatively small air-ports 55 uniformly spaced apart. A piston 56, working as a port-controlling valve in the cylinder, has a stem 57, shown tubular, extending from it nearly to the bottom of the pontoon-shell in line with a water-outlet opening 58 therein. On the tubular stem, near its lower end, which is closed by a screw-cap 59, is provided a sleeve 60 confining between it and a collar 61 a spiral spring 62 about the stem; and from this sleeve depend cage-forming legs 63 connected at their lower ends by a ring 64 bolted to the inner surface of the shell about the opening 58, the same and additional bolts passing through a ring 65 to fasten it to the outer surface of the shell about that opening, where it is formed with an annular valve-seat 66. A bowl-shaped protecting hood 67, provided at intervals about its exterior with outwardly-projecting protecting-ribs 68 and containing a central base-opening with a guide-thimble 69 through it, depends from the ring 65. A continuation 70 of the stem 57 has a head 71 at which it is confined in a recess in the bottom of the cap 59 by a flanged sleeve 72 bolted through its flange to the lower face of the cap. This member 70 terminates at its lower end in a valve-head 73 closing upwardly against the seat 66 and having a depending cylindrical skirt 74 containing ports 75 and guidingly fitting within the thimble 69.

A valve-device 76 connecting upper and lower openings in the shell 15 at the opposite side of the pipe 44, and from the upper end of which a flexible tube 77 extends, is in every detail of construction like the one from which the tube 52 extends, except that it need not be provided with any ports in its cylinder 46 (unless the partial bulkhead 16 is used, in which case it should be provided with the ports), so that no further description is needed of the valve-device 76. It affords however a water-inlet and pressure-equalizing valve, as and for the purpose hereinafter explained.

To use the pontoon thus described, a number thereof are carried to the place of use, where a sunken ship (a small section of which is indicated at A in Fig. 2) is to be raised, on a wrecking-vessel equipped with an air-compressor of any suitable type having a distributer-head with valved discharge-ports for the compressed air and each of which is connected with one of the flexible tubes 52 and 77 at its upper end. This equipment of a wrecking-vessel presents no features of novelty, being well-known in the art and requires no illustration or detailed description herein.

A diver fastens the ends of a pair of cables 28, for guiding the pontoon in sinking it, to the ship to be raised. This may be done, as indicated in Fig. 2, by providing a loop on the cable-end to surround a bar 78 inserted lengthwise through a port-hole 79 in the ship's hull and then turned to cross the port-hole. These cables, on which the pontoon is strung through the tubes 17, are suitably fastened at their upper ends on the wrecking-ship. When a pontoon has been launched into the body of water wherein it is to be sunk, the valve controlling the tube 77 is opened to admit air-pressure through the latter against the piston of the valve-device 76 to drive downwardly its stem and unseat the valve 73 on its lower end. Then, water coming through the thimble 69 of that valve-device gradually fills the pontoon-shell, driving the air therein out through the end check-valves 32 and tubes 37, which latter are provided with shut-off valves on their upper ends. Thus weighting a pontoon sinks it along the cables 28 to a point as close as desirable to the sunken ship. When, in the descent of a pontoon, the water therein rises to the lower edge of the partial bulkhead 16, it seals the compartments at opposite sides of the bulkhead against intercommunication. Then if, for any reason, the water thereafter rises faster in one compartment than in the other, thereby overloading it and tending to tip the pontoon, with the binding effect against the cables hereinbefore referred to, the escape of air-pressure through a tube 37, from the overloaded compartment, may be arrested by closing the shut-off valve in the tube to check the rise of water in the compartment until equilibrium is established between both compartments. In this way the pontoon may be sunk with an even keel throughout its descent, which is a very important practical advantage afforded by the partial bulkhead. To indicate any irregularity, by endwise-tilting, in sinking a pontoon, it has attached to each end, as shown in Figs. 1, 2 and 3, light cables 80 carrying, at intervals of a few feet, float-balls 81. These balls are of different colors, and are provided at corresponding intervals on the two cables 80 with the balls at those intervals of the same color, so that if, when only one ball of a pair of the same color nearest the surface of the water shows, that showing indicates the overweighting of the pontoon at one end and the necessity for arresting the escape of compressed air from the compartment at that end to check the rise. When a pontoon has been sunk, the valve at the distributer-end of the tube 77 is closed and the pressure of water against the valve 73 closes the latter.

When pontoons in desired number have been thus submerged and fastened to different parts of the hull of the sunken ship, the water in them is discharged from each by the admission of air under pressure to lighten it by supplanting the water, and render the pontoon buoyant to tend to cause it to rise and raise the sunken ship. This is accomplished by opening the valve controlling the connection of the tube 52 (and if the partial bulkhead is used, also that controlling tube 77) with the aforesaid air-compressor, to introduce air under pressure against the piston (or each piston) 56 and depress it until it passes the ports 53, 55, thereby admitting air-pressure into the shell 15 against the water therein, and unseating the valve or valves 73 for the discharge of the water under the force of the air-pressure. With the valve in the hydrometer spout 45ª open, while the water is discharging from the pontoon-shell, water will discharge from that spout until the shell is emptied, whereupon only air will discharge, indicating that the pontoon has been emptied of water, when the spout-valve is closed; and the air-pressure in the shell 15, acting through the pipe 44 and tube 43 upon the gage on the hydrometer-device, will cause the gage to indicate the air-pressure in the shell.

As will be understood, the pontoon with its equipment as illustrated operates best when no partial bulkhead 16 is used; but with the latter it is preferable to have the valve-device 76 also provided with air-pressure inlet-ports 53, 55 to insure simultaneous and uniform evacuating action of the admitted air-pressure against the water in the shell at both sides of the member 16, since such pressure at only one side thereof might tend to force water therefrom into the other side and thus to prevent the rise of the pontoon with desirable even keel.

When the number of pontoons employed are rendered buoyant by evacuating them of their contained sinking-water, in their rise the resultant grip of the eccentrics 29 against the cables 28 clutches them to the sunken vessel, so that the pontoons cannot rise without carrying it with them to raise it.

The air-content under pressure in a sunken pontoon resists the crushing tendency upon it of the pressure of the body of water in which it is immersed. As the pontoon rises, the water-pressure against it decreases, so that if the air-pressure within it remained the same it might be sufficient to burst the shell. That is avoided by the automatic action of the valve-device 76, since as the interior air-pressure comes materially to exceed the external water-pressure, the air-pressure opens the valve of the valve-device 76 against the closing-tendency of its spring 62, permitting the excess of air-pressure to escape through the water in which the shell is submerged.

As will be understood, the water may also flow out of the pontoon, for emptying it, not only through the valve device 76 when the pressure overcomes the closing tendency of the latter's spring 62, thereby expediting the evacuation but also through the companion valve device.

It is realized that considerable variation is possible in the details of construction thus specifically shown and described, and it is not intended by illustrating a single, specific or preferred form to limit the invention thereto, the intention being in the following claims to claim protection upon all the novelty there may be in the device as broadly as the state of the art will permit.

Claims:

1. A submergible pontoon comprising a shell equipped with a valve-device having an upper air-pressure inlet, a valve controlling said inlet, a lower water-valve and a stem connecting said valves and maintaining them in constant operative position thereon relative to the air and water ports they respectively control.

2. A submergible pontoon comprising a shell equipped with a valve-device having an upper air-pressure-inlet cylinder, a piston in said cylinder controlling the admission of air-pressure into the pontoon, and a lower water-valve having a stem-connection with the piston.

3. A submergible pontoon comprising a shell equipped with an upper valved air-pressure outlet, and a valve-device having an upper air-pressure-inlet cylinder, a piston in said cylinder controlling the admission of air-pressure into the pontoon, and a lower water-valve, having a stem-connection with the piston.

4. A submergible pontoon comprising a shell equipped with a valve-device having an upper air-pressure-inlet cylinder, a piston in said cylinder controlling the admission of air-pressure into the pontoon, and a lower water-valve having a stem-connection with the piston, a partial bulkhead depending in the shell between its ends and extending short of the shell-bottom, and upper valved air-pressure outlets at opposite sides of said bulkhead.

5. A submergible pontoon comprising a shell equipped with upper air-pressure inlets and lower valved water inlets and outlets, a bulkhead extending in the shell partway to its bottom and partially dividing it into compartments, cables on the ends of the shell, and float-balls at corresponding intervals on the two cables, said balls forming pairs of similar members on the respective cables.

6. In combination, a submergible pontoon comprising a shell equipped with upper air-pressure inlets and valved lower water inlets and outlets, and a pipe depending through the top of the shell and extending nearly to its bottom, a tube connected at one end with the upper end of said pipe, and a combined hydrometer and pressure-gage device connected with the opposite end of said tube and provided with a valved discharge-spout.

7. A submergible pontoon comprising a shell equipped with a valve-device having an upper air-pressure inlet, a valve controlling said inlet, a lower water-valve and a stem connecting said valves and maintaining them in constant operative position thereon relative to the air and water ports they respectively control, and cable guiding and clutching means extending through the shell at opposite sides of its transverse center.

8. A submergible pontoon having a shell containing an air-inlet opening in its top and a water outlet and inlet opening in its bottom, and equipped with a valve-device comprising a cylinder in the shell about said top-opening containing ports, a cap covering the cylinder and adapted to be connected with an air-pressure supply, a piston in the cylinder having a stem, and a valve for said bottom-opening on the lower end of said stem closing upwardly against its seat.

9. A submergible pontoon having a shell containing an air-inlet opening in its top and a water outlet and inlet opening in its bottom, and equipped with a valve-device comprising a cylinder in the shell about said top-opening containing ports, a cap covering the cylinder and adapted to be connected with an air-pressure supply, a piston in the cylinder having a stem, a sleeve about the stem near its lower end having depending legs terminating in a ring secured to the inner side of the shell about said bottom opening, a spiral spring confined about the stem against said sleeve, a hood having a ring about its upper end provided with an annular depending valve-seat and at which it is secured to the outer surface of the shell through the ring, said hood having a bottom opening containing a thimble, and a valve on the lower end of the stem below said seat and having a depending skirt containing ports and working in said thimble.

10. A submergible pontoon having a shell containing air-inlet openings in its top at opposite sides of its transverse center, an opening in its bottom alining with one of said inlet-openings and a second opening in its bottom alining with the other air-inlet opening, said shell being equipped with a valve-device for one of said air-inlets and the bottom-opening alining therewith, said valve-device comprising a cylinder in the shell about the air-inlet containing ports, a cap covering the cylinder and adapted to be connected with an air-pressure supply, a piston in the cylinder having a stem, and a valve on the lower end of the stem closing upwardly against its seat, and a valve-device for said other alining openings, the counterpart in construction of said first-named valve-device but devoid of ports in its cylinder.

F. JAVIER SALAS,
*Administrator of the Estate of Fernando Staud y Ximenez, deceased.*